(12) United States Patent
Vedantham et al.

(10) Patent No.: US 9,531,563 B2
(45) Date of Patent: Dec. 27, 2016

(54) EFFICIENT FAIRNESS ALLOCATION IN POWERLINE CSMA/CA PROTOCOLS

(71) Applicant: Texas Instruments Incorporated, Dallas, TX (US)

(72) Inventors: Ramanuja Vedantham, Allen, TX (US); Kumaran Vijayasankar, Allen, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 14/949,069

(22) Filed: Nov. 23, 2015

(65) Prior Publication Data

US 2016/0080169 A1    Mar. 17, 2016

Related U.S. Application Data

(63) Continuation of application No. 14/254,410, filed on Apr. 16, 2014, now Pat. No. 9,198,198.

(60) Provisional application No. 61/812,525, filed on Apr. 16, 2013.

(51) Int. Cl.
*H04L 12/413* (2006.01)
*H04W 74/08* (2009.01)
*H04B 3/54* (2006.01)
*H04L 1/00* (2006.01)
*H04L 5/00* (2006.01)

(52) U.S. Cl.
CPC ............... *H04L 12/413* (2013.01); *H04B 3/54* (2013.01); *H04L 1/0002* (2013.01); *H04L 5/0007* (2013.01); *H04W 74/0816* (2013.01); *H04B 2203/5408* (2013.01); *H04B 2203/5425* (2013.01)

(58) Field of Classification Search
None
See application file for complete search history.

(56) References Cited

U.S. PATENT DOCUMENTS

| | | | |
|---|---|---|---|
| 6,907,044 B1 * | 6/2005 | Yonge, III | H04W 74/02 370/445 |
| 7,570,656 B2 * | 8/2009 | Raphaeli | H04B 3/542 370/445 |
| 2002/0154653 A1* | 10/2002 | Benveniste | H04L 12/4013 370/447 |

(Continued)

*Primary Examiner* — Brian Roberts
(74) *Attorney, Agent, or Firm* — John R. Pessetto; Charles A. Brill; Frank D. Cimino (57) ABSTRACT

Transmission over a communication channel using carrier sense multiple access collision avoidance (CSMA/CA) may be performed by determining for each frame if the communication channel is busy after a backoff time proportional to a randomly generated number within a contention window (CW). When the channel is not busy, a frame of data may be transmitted. When the channel is busy, the device may periodically determine if the communication channel is busy after subsequent backoff times. The value of CW is adjusted for each subsequent backoff time using a fairness protocol, in which the value of CW is increased until the value of CW reaches a maximum CW value; and then the value of CW is held until a fairness number of backoff repetitions reaches a fairness threshold; then the value of CW is reduced incrementally until the value of CW reaches a minimum CW value.

16 Claims, 7 Drawing Sheets

(56) References Cited

U.S. PATENT DOCUMENTS

| | | | | |
|---|---|---|---|---|
| 2004/0004973 A1* | 1/2004 | Lee | ................ | H04L 47/10 |
| | | | | 370/445 |
| 2004/0264423 A1* | 12/2004 | Ginzburg | ......... | H04W 74/0816 |
| | | | | 370/338 |
| 2005/0070317 A1* | 3/2005 | Liu | ............. | H04W 74/085 |
| | | | | 455/502 |
| 2006/0034208 A1* | 2/2006 | Blouin | ............ | H04L 1/1887 |
| | | | | 370/328 |
| 2006/0245447 A1* | 11/2006 | Chou | ............ | H04L 12/413 |
| | | | | 370/445 |
| 2009/0207747 A1* | 8/2009 | Kim | ............ | H04L 43/0811 |
| | | | | 370/252 |
| 2012/0088536 A1* | 4/2012 | Hwang | ......... | H04W 74/0816 |
| | | | | 455/515 |
| 2014/0169290 A1* | 6/2014 | Seok | ............ | H04W 74/006 |
| | | | | 370/329 |

\* cited by examiner

EFFICIENT FAIRNESS ALLOCATION IN POWERLINE CSMA/CA PROTOCOLS

CLAIM OF PRIORITY UNDER 35 U.S.C. 119(e)

This application is a Continuation of prior application Ser. No. 14/254,410, filed Apr. 16, 2014, now U.S. Pat. No. 9,198,198, issued Nov. 24, 2015;

and claims priority to and incorporates by reference U.S. Provisional Application No. 61/812,525, filed Apr. 16, 2013, entitled "Efficient Fairness Allocation in Powerline CSMA/CA Protocols."

FIELD OF THE INVENTION

This invention generally relates to communication between devices using CSMA/CA communication protocols, and in particular to communication over power lines.

BACKGROUND OF THE INVENTION

Power Line Communication (PLC) is one of the technologies used for automatic meter reading, for example. Both one-way and two-way systems have been successfully used for decades. Interest in this application has grown substantially in recent history because utility companies have an interest in obtaining fresh data from all metered points in order to better control and operate the utility grid. PLC is one of the technologies being used in Advanced Metering Infrastructure (AMI) systems.

A PLC carrier repeating station is a facility at which a PLC signal on a power line is refreshed. The signal is filtered out from the power line, demodulated and modulated, and then re-injected onto the power line again. Since PLC signals can carry long distances (several 100 kilometers), such facilities typically exist on very long power lines using PLC equipment.

In a one-way system, readings "bubble up" from end devices (such as meters), through the communication infrastructure, to a "master station" which publishes the readings. A one-way system might be lower-cost than a two-way system, but also is difficult to reconfigure should the operating environment change.

In a two-way system, both outbound and inbound traffic is supported. Commands can be broadcast from a master station (outbound) to end devices, such as meters, that may be used for control and reconfiguration of the network, to obtain readings, to convey messages, etc. The device at the end of the network may then respond (inbound) with a message that carries the desired value. Outbound messages injected at a utility substation will propagate to all points downstream. This type of broadcast allows the communication system to simultaneously reach many thousands of devices. Control functions may include monitoring health of the system and commanding power shedding to nodes that have been previously identified as candidates for load shed. PLC also may be a component of a Smart Grid.

The power line channel is very hostile. Channel characteristics and parameters vary with frequency, location, time and the type of equipment connected to it. The lower frequency regions from 10 kHz to 200 kHz are especially susceptible to interference. Furthermore, the power line is a very frequency selective channel. Besides background noise, it is subject to impulsive noise often occurring at 50/60 Hz, and narrowband interference and group delays up to several hundred microseconds.

OFDM is a modulation technique that can efficiently utilize this limited low frequency bandwidth, and thereby allows the use of advanced channel coding techniques. This combination facilitates a very robust communication over a power line channel.

On Sep. 30, 2010, the IEEE's 1901 Broadband Powerline Standard was approved and HomePlug AV, as baseline technology for the FFT-OFDM PHY within the standard, is now ratified and validated as an international standard. The HomePlug Powerline Alliance is a certifying body for IEEE 1901 products. The three major specifications published by HomePlug (HomePlug AV, HomePlug Green PHY and HomePlug AV2) are interoperable and compliant.

Another set of open standards has been developed for power line communication (PLC) at the request of Electricité Réseau Distribution France (ERDF), a wholly owned subsidiary of the EDF (Electricité de France) Group. The set of standards include "PLC G3 Physical Layer Specification," undated, ERDF; and "PLC G3 MAC Layer Specification," undated, ERDF. These standards are intended to facilitate the implementation of an automatic meter-management (AMM) infrastructure in France; however, PLC using these standards or similar technology may be used by power utilities worldwide.

The G3 standards promote Interoperability and coexists with IEC 61334, IEEE® P1901, and ITU G.hn systems. 10 kHz to 490 kHz operation complies with FCC, CENELEC, and ARIB. CENELEC is the European Committee for Electrotechnical Standardization and is responsible for standardization in the electro technical engineering field. ARIB is a Japanese standards organization.

Generally speaking, prior to transmitting a signal across power lines or wires, a PLC device may attempt to detect whether a given communication or access channel (e.g., frequency band) is currently in use. Channel access may be accomplished, for example, by using the Carrier Sense Multiple Access with Collision Avoidance (CSMA/CA) mechanism with a random backoff time.

BRIEF DESCRIPTION OF THE DRAWINGS

Particular embodiments in accordance with the invention will now be described, by way of example only, and with reference to the accompanying drawings.

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description CSMA/CA (Carrier Sense Multiple Access/Collision Avoidance) is the channel access mechanism used by most wireless LANs in the ISM bands. A channel access mechanism is the part of the protocol which specifies how the node uses the medium; when to listen, when to transmit.

CSMA/CA is derived from CSMA/CD (Collision Detection), which is the base of Ethernet. The main difference is the collision avoidance. On a wire, the transceiver has the ability to listen while transmitting and so to detect collisions. Typically, Ethernet transmissions have approximately the same strength. However, for wireless networks, even if a radio node could listen on the channel while transmitting, the strength of its own transmissions would mask all other signals on the air. Similarly, in the PLC environment, there is so much noise and other interference it is difficult to talk and listen at the same time. Therefore, the PLC protocol does not directly detect collisions like with Ethernet and instead tries to avoid them.

IEEE standard P1901.2 specifies communications for low frequency (less than 500 kHz) narrowband power line devices via alternating current and direct current electric power lines. This standard supports indoor and outdoor communications in the following environments: a.) low voltage lines (less than 1000 v), such as the line between a utility transformer and meter; b) through transformer low-voltage to medium-voltage (1000 V up to 72 kV); and c) through transformer medium-voltage to low-voltage power lines in both urban and in long distance (multi-kilometer) rural communications. The standard uses transmission frequencies less than 500 kHz. Data rates are scalable to 500 kbps depending on the application requirements. This standard addresses grid to utility meter, electric vehicle to charging station, and within home area networking communications scenarios. Lighting and solar panel power line communications are also potential uses of this communications standard. This standard focuses on the balanced and efficient use of the power line communications channel by all classes of low frequency narrow band (LF NB) devices, defining detailed mechanisms for coexistence between different LF NB standards developing organizations (SDO) technologies, assuring that desired bandwidth may be delivered. This standard assures coexistence with broadband power line (BPL) devices by minimizing out-of-band emissions in frequencies greater than 500 kHz. The standard addresses the necessary security requirements that assure communication privacy and allow use for security sensitive services. This standard defines the physical layer and the medium access sub-layer of the data link layer, as defined by the International Organization for Standardization (ISO) Open Systems Interconnection (OSI) Basic Reference Model. IEEE P1901.2 was based on G3 but has several additional features that make it not backward compatible with G3-PLC.

The protocol starts by a device listening on the channel, referred to as carrier sense. When the channel is found to be idle, the device may send the first packet in the transmit queue. If the channel is busy due to either another node transmission or interference, the device waits until the end of the current transmission and then starts a contention process. Each node that is waiting to transmit waits a random amount of time. When its contention timer expires for each waiting node, if the channel is still idle, the node may send a packet. The node having chosen the shortest contention delay wins and transmits its packet. The other nodes must wait for the next contention at the end of this packet. Because the contention is a random number and done for every packet, each node is given an equal chance to access the channel on average.

However, due to the large number of nodes that may be present in a PLC network, there may be a lot of traffic during some periods. In this case, some nodes may end up waiting for long periods of time before they win a contention contest. This is due in part because the IEEE 1901.2 protocol allows a node that loses a contention to then use a small contention window range (CW) from which to select a random wait value. If it loses again, the CW value is increased. Therefore, when a node loses several contention contests, it may end up with the maximum CW value and therefore may tend to lose out to other nodes that have only recently initially lost and therefore have a smaller CW value.

Embodiments of the invention now provide a measure of fairness and allow a node that has attempted a certain number of times unsuccessfully to reduce the CW variable using a tunable slope until it reaches a minimum CW value (minCW) based on an adaptive rate factor (R) to increase the probability of access to the channel. A fairness variable referred to as the number of backoffs for fairness limit (NBF), a threshold parameter referred to as the CSMA fairness limit (CSMAFairnessLimit), and the rate adaptation factor (R) may be used to tune the CW slope.

Once the NBF reaches the CSMAFairnessLimit for the number of unsuccessful attempts (channel access failures), embodiments may either retain the existing contention window for a number of retries or decrease it based on the rate adaptation variable R. Once the contention window reaches the minimum contention window value, the NBF may be reset to zero and the process repeated. In this manner, a node that loses a series of contention contests may increase the value of CW until the value of CW reaches a maximum CW value (maxCW); then hold the value of CW until the fairness number of backoff (NBF) repetitions reaches a fairness threshold (CSMAFairnessLimit); then incrementally reduce the value of CW until the value of CW reaches a minimum CW value (minCW). Various options and permutations for this CW tuning process will be described in more detail below.

Figure 1:
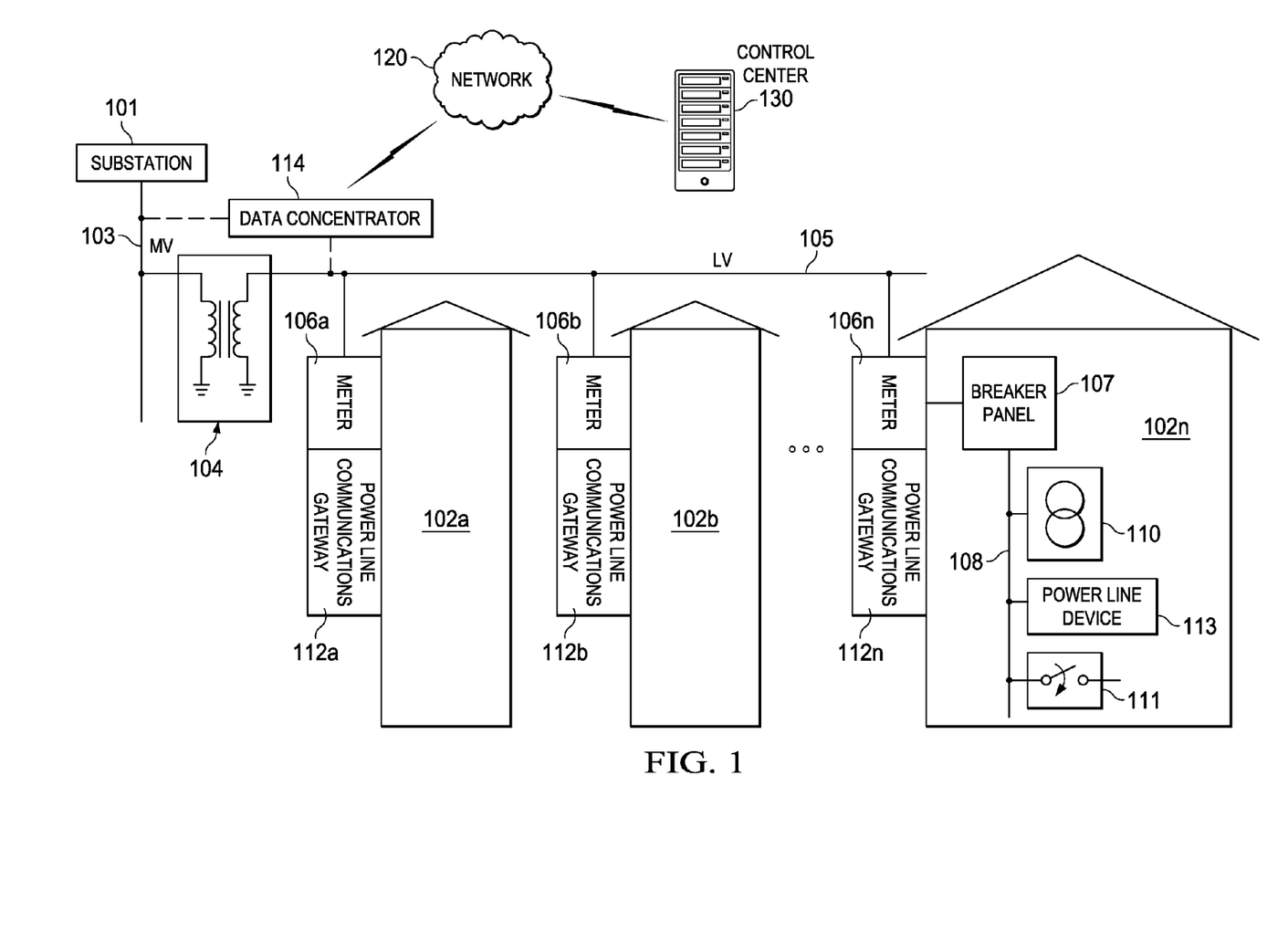
FIG. 1 is a conceptual diagram of a PLC system that uses CSMA/CA.

FIG. 1 is a conceptual diagram of a PLC system in which an electric power distribution system is depicted. Medium voltage (MV) power lines 103 from substation 101 typically carry voltage in the tens of kilovolts range. Transformer 104 steps the MV power down to low voltage (LV) power on LV lines 105, carrying voltage in the range of 100-240 VAC. Transformer 104 is typically designed to operate at very low frequencies in the range of 50-60 Hz. Transformer 104 does not typically allow high frequencies, such as signals greater than 100 KHz, to pass between LV lines 105 and MV lines 103. LV lines 105 feed power to customers via meters 106a-n, which are typically mounted on the outside of residences 102a-n. Although referred to as "residences," premises 102a-n may include any type of building, facility, or location where electric power is received and/or consumed. A breaker panel, such as panel 107, provides an interface between meter 106n and electrical wires 108 within residence 102n. Electrical wires 108 deliver power to outlets 110, switches 111, and other electric devices within residence 102n.

The power line topology illustrated in FIG. 1 may be used to deliver high-speed communications to residences 102a-n. In some implementations, power line communications modems or gateways 112a-n may be coupled to LV power lines 105 at meter 106a-n. PLC modems/gateways 112a-n may be used to transmit and receive data signals over MV/LV lines 103/105. Such data signals may be used to support metering and power delivery applications (e.g., smart grid applications), communication systems, high speed Internet, telephony, video conferencing, and video delivery, to name a few. By transporting telecommunications and/or data signals over a power transmission network, there is no need to install new cabling to each subscriber 102a-n. Thus, by using existing electricity distribution systems to carry data signals, significant cost savings are possible.

An illustrative method for transmitting data over power lines may use, for example, a carrier signal having a frequency different from that of the power signal. The carrier signal may be modulated by the data, for example, using an orthogonal frequency division multiplexing (OFDM) scheme or the like. The examples described below are based on IEEE 1901.2, however, other embodiments may use other CSMA/CA protocols now known or later developed.

PLC modems or gateways 112a-n at residences 102a-n use the MV/LV power grid to carry data signals to and from PLC data concentrator 114 without requiring additional wiring. Concentrator 114 may be coupled to either MV line 103 or LV line 105. Modems or gateways 112a-n may support applications such as high-speed broadband Internet links, narrowband control applications, low bandwidth data collection applications, or the like. In a home environment, for example, modems or gateways 112a-n may further enable home and building automation in heat and air conditioning, lighting, and security. Also, PLC modems or gateways 112a-n may enable AC or DC charging of electric vehicles and other appliances. An example of an AC or DC charger is illustrated as PLC device 113. Outside the premises, power line communication networks may provide street lighting control and remote power meter data collection.

One or more data concentrators 114 may be coupled to control center 130 (e.g., a utility company) via network 120. Network 120 may include, for example, an IP-based network, the Internet, a cellular network, a WiFi network, a WiMax network, or the like. As such, control center 130 may be configured to collect power consumption and other types of relevant information from gateway(s) 112 and/or device (s) 113 through concentrator(s) 114. Additionally or alternatively, control center 130 may be configured to implement smart grid policies and other regulatory or commercial rules by communicating such rules to each gateway(s) 112 and/or device(s) 113 through concentrator(s) 114.

In some embodiments, each concentrator 114 may be seen as a base node for a PLC domain, each such domain comprising downstream PLC devices that communicate with control center 130 through a respective concentrator 114. For example, in FIG. 1, device 106a-n, 112a-n, and 113 may all be considered part of the PLC domain that has data concentrator 114 as its base node; although in other scenarios other devices may be used as the base node of a PLC domain. In a typical situation, multiple nodes may be deployed in a given PLC network, and at least a subset of those nodes may be tied to a common clock through a backbone (e.g., Ethernet, digital subscriber loop (DSL), etc.). Further, each PLC domain may be coupled to MV line 103 through its own distinct transformer similar to transformer 104.

Still referring to FIG. 1, meter 106, gateways 112, PLC device 113, and data concentrator 114 may each be coupled to or otherwise include a PLC modem or the like. The PLC modem may include transmitter and/or receiver circuitry to facilitate the device's connection to power lines 103, 105, and/or 108.

Figure 2:
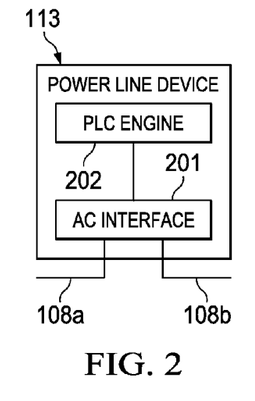
FIG. 2 is a block diagram of an example PLC device or modem for use in the PLC system of FIG. 1.

FIG. 2 is a block diagram of PLC device or modem 113 that may include an embodiment of the CSMA/CA protocol described herein. As illustrated, AC interface 201 may be coupled to electrical wires 108a and 108b inside of premises 112n in a manner that allows PLC device 113 to switch the connection between wires 108a and 108b off using a switching circuit or the like. In other embodiments, however, AC interface 201 may be connected to a single wire 108 (i.e., without breaking wire 108 into wires 108a and 108b) and without providing such switching capabilities. In operation, AC interface 201 may allow PLC engine 202 to receive and transmit PLC signals over wires 108a-b. As noted above, in some cases, PLC device 113 may be a PLC modem. Additionally or alternatively, PLC device 113 may be a part of a smart grid device (e.g., an AC or DC charger, a meter, etc.), an appliance, or a control module for other electrical elements located inside or outside of premises 112n (e.g., street lighting, etc.).

PLC engine 202 may be configured to transmit and/or receive PLC signals over wires 108a and/or 108b via AC interface 201 using a particular channel or frequency band. In some embodiments, PLC engine 202 may be configured to transmit OFDM signals, although other types of modulation schemes may be used. As such, PLC engine 202 may include or otherwise be configured to communicate with metrology or monitoring circuits (not shown) that are in turn configured to measure power consumption characteristics of certain devices or appliances via wires 108, 108a, and/or 108b. PLC engine 202 may receive such power consumption information, encode it as one or more PLC signals, and transmit it over wires 108, 108a, and/or 108b to higher-level PLC devices (e.g., PLC gateways 112n, data concentrators 114, etc.) for further processing. Conversely, PLC engine 202 may receive instructions and/or other information from such higher-level PLC devices encoded in PLC signals, for example, to allow PLC engine 202 to select a particular frequency band in which to operate.

Figure 3:
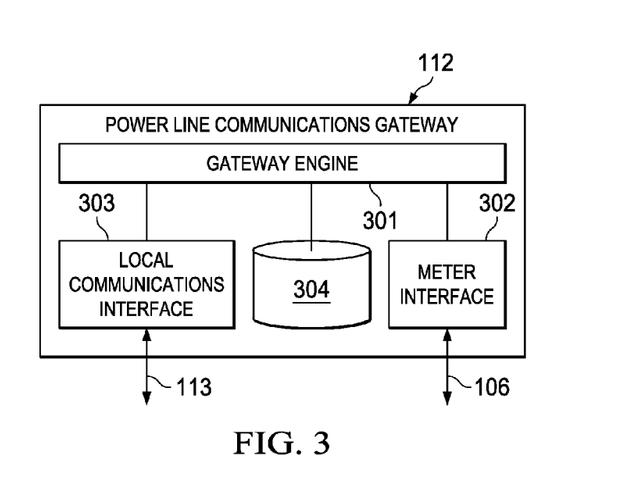
FIG. 3 is a block diagram of an example PLC gateway for use in the PLC system of FIG. 1.

FIG. 3 is a block diagram of PLC gateway 112 that may include an embodiment of the CSMA/CA protocol described herein. As illustrated in this example, gateway engine 301 is coupled to meter interface 302, local communication interface 303, and frequency band usage database 304. Meter interface 302 is coupled to meter 106, and local communication interface 304 is coupled to one or more of a variety of PLC devices such as, for example, PLC device 113. Local communication interface 304 may provide a variety of communication protocols such as, for example, ZIGBEE, BLUETOOTH, WI-FI, WI-MAX, ETHERNET, etc., which may enable gateway 112 to communicate with a wide variety of different devices and appliances. In operation, gateway engine 301 may be configured to collect communications from PLC device 113 and/or other devices, as well as meter 106, and serve as an interface between these various devices and PLC data concentrator 114. Gateway engine 301 may also be configured to allocate frequency bands to specific devices and/or to provide information to such devices that enable them to self-assign their own operating frequencies.

In some embodiments, PLC gateway 112 may be disposed within or near premises 102n and serve as a gateway to all PLC communications to and/or from premises 102n. In other embodiments, however, PLC gateway 112 may be absent and PLC devices 113 (as well as meter 106n and/or other appliances) may communicate directly with PLC data concentrator 114. When PLC gateway 112 is present, it may include database 304 with records of frequency bands currently used, for example, by various PLC devices 113 within premises 102n. An example of such a record may include, for instance, device identification information (e.g., serial number, device ID, etc.), application profile, device class, and/or currently allocated frequency band. As such, gateway engine 301 may use database 304 in assigning, allocating, or otherwise managing frequency bands assigned to its various PLC devices.

Figure 4:
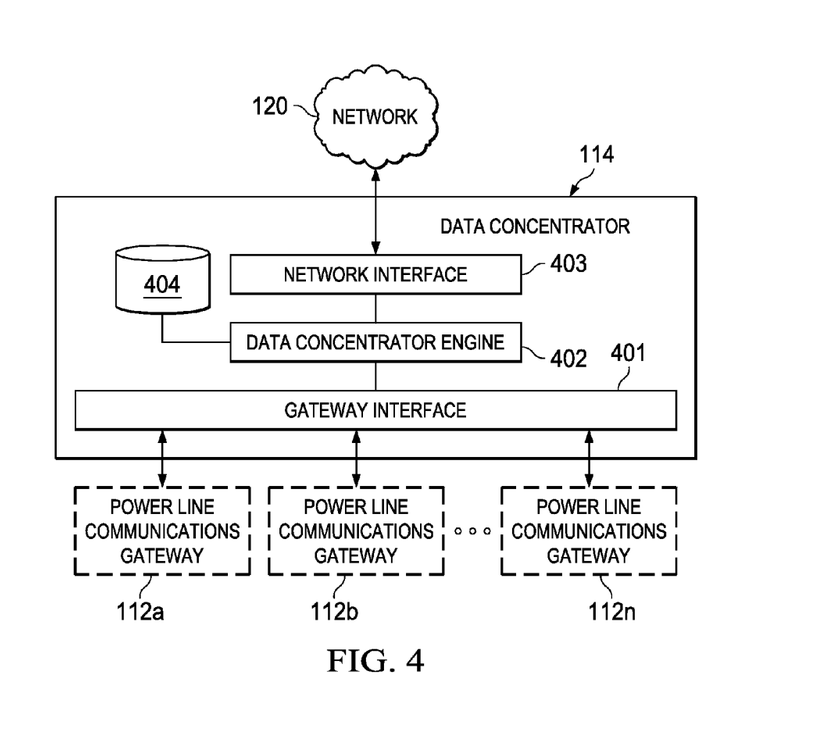
FIG. 4 is a block diagram of an example PLC data concentrator for use in the PLC system of FIG. 1.

FIG. 4 is a block diagram of a PLC data concentrator that may include an embodiment of the CSMA/CA protocol described herein. Gateway interface 401 is coupled to data concentrator engine 402 and may be configured to communicate with one or more PLC gateways 112a-n. Network interface 403 is also coupled to data concentrator engine 402 and may be configured to communicate with network 120. In operation, data concentrator engine 402 may be used to collect information and data from multiple gateways 112a-n before forwarding the data to control center 130. In cases where PLC gateways 112a-n are absent, gateway interface 401 may be replaced with a meter and/or device interface (now shown) configured to communicate directly with meters 116a-n, PLC devices 113, and/or other appliances. Further, if PLC gateways 112a-n are absent, frequency usage database 404 may be configured to store records similar to those described above with respect to database 304.

CSMA/CA

Each PLC device will typically include a receiver with an analog front end configured to receive orthogonal frequency division multiplexing (OFDM) symbols from a power line and an OFDM demodulator. Each PLC device will also typically include a transmitter with an analog front end configured to couple OFDM symbols to the power line, and a modulator configured to produce the OFDM symbols representative of data.

Generally speaking, prior to transmitting a signal across power lines or wires 103, 105, and/or 108, a PLC device may attempt to detect whether a given communication or access channel (e.g., frequency band) is currently in use. Channel access may be accomplished, for example, by using the Carrier Sense Multiple Access with Collision Avoidance (CSMA/CA) mechanism with a random backoff time. The random backoff mechanism may spread the time over which PLC devices attempt to transmit, thereby reducing the probability of collision. In other words, each time a device wishes to transmit data frames, it may wait for a random period. If the channel is found to be idle or free, following the random backoff, the device may transmit its data. If the channel is found to be busy, following the random backoff, the device may wait for another random period before trying to access the channel again.

Carrier sense is a fundamental part of the distributed access procedure. Physical Carrier Sense (PCS) is provided by the PHY layer of a layered protocol stack upon detection of a preamble in the frame control header. In the latter case, a PCS signal is asserted long enough to be detected and a Virtual Carrier Sense (VCS) is asserted by a media access control (MAC) layer in the protocol stack. A virtual carrier sense mechanism may be provided by the MAC by tracking the expected duration of channel occupancy. Virtual carrier sense is set by the length of received packet or upon collision. In these cases, virtual carrier sense tracks the expected duration of the Busy state of the medium. The medium is to be considered Busy when the station is transmitting.

A VCS timer may be maintained by all stations to improve reliability of channel access. The VCS timer may be set based on received long (data) or short (ACK) frames. The VCS timer may also be set upon collision or when the station powers up. Stations use this information to compute the expected Busy condition of the medium or the expected duration of the Contention State and store this information in the VCS timer.

A Collision occurs in each of the following circumstances: the transmitting station receives a something other than ACK or NACK response when a response is expected. The transmitting station must infer a Collision from the absence of any response to a transmission when a response is expected. Note that the absence of a response could also be the result of a bad channel. Since there is no way to distinguish between the two causes a Collision is inferred.

Figure 5:
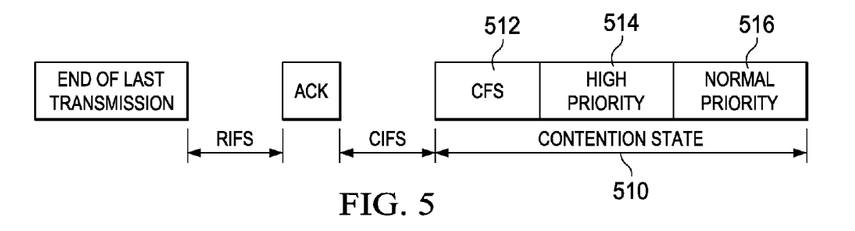
FIG. 5 is a timeline illustrating a contention window portion of a PLC CSMA/CA transmission sequence.

FIG. 5 is a timeline illustrating a contention window portion of a PLC transmission sequence. Time intervals between frames on the medium constitute Interframe Space (IFS) and are necessary due to propagation and processing time. Contention Interframe Space (CIFS) occurs after the end of the previous transmission. The second defined interval is the Response Interframe Space (RIFS). RIFS is the time between the end of a transmission and the start of its associated response. If no response is expected, the CIFS is in effect.

Priority

Prioritized access to the channel can be beneficial for real time application or control application when an urgent message should be delivered as soon as possible. Only two levels of priority (High and Normal) are currently included in the 1901.2 specification to minimize complexity. Priority resolution is implemented by using two contention time windows during the contention state as shown in FIG. 5. A first slot of contention window 510 is called a Contention Free Slot (CFS) 512. It is used to implement a packet bursting without backoff procedure in order to prevent possible interruption from other nodes. The high and normal priority stations will compete for channel during HPCW (high priority contention window) 514 and NPCW (normal priority contention window) 516 correspondingly. Since HPCW is located before NPCW, high priority stations will get access to the channel before stations with normal priority. Duration of HPCW and NPCW are calculated as indicated by equations (1)-(3), where maxBE is the maximum backoff exponent and typically has a value of eight.

$$\text{HPCW time} = \text{macHighPrioirtyWindowSize} * a\text{SlotTime} \quad (1)$$

$$\text{NPCW time} = (2^{\wedge}_{maxBE} * a\text{SlotTime}) - \text{HPCW time} \quad (2)$$

$$\text{CFS time} = a\text{SlotTime} \quad (3)$$

Figure 6:
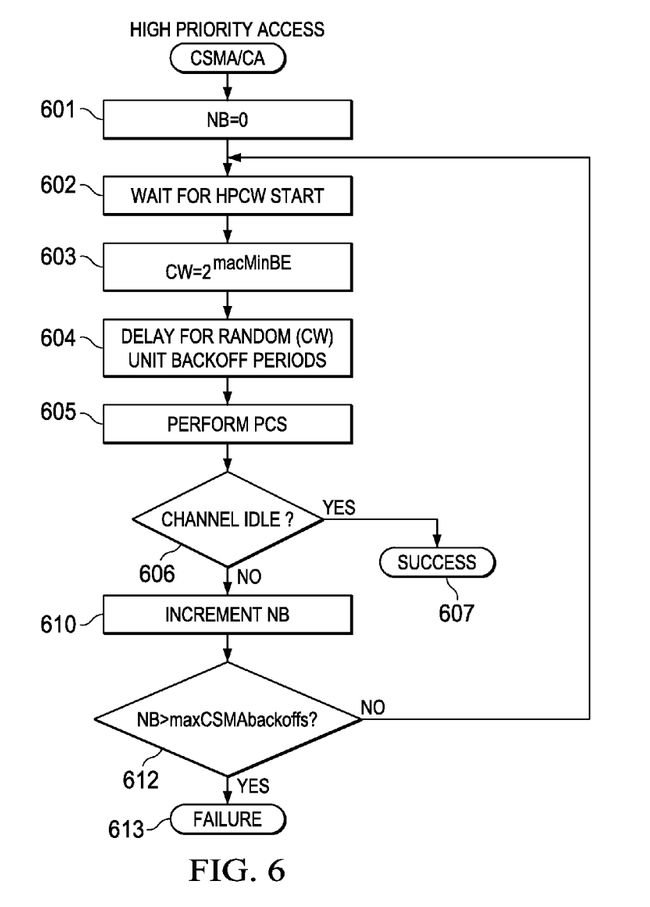
FIG. 6 is a flow diagram illustrating a high priority CSMA/CA access in the PLC system of FIG. 1.

FIG. 6 is a flow diagram illustrating a high priority CSMA/CA access in the PLC system of FIG. 1. As illustrated in block 501, each device may maintain two variables for each transmission attempt: NB and BE. Specifically, NB is the number of times the CSMA algorithm was required to backoff while attempting the current transmission and may be initialized to 0 at the beginning 601 of the transaction attempt. Thus, the method may initialize NB and then proceed to block 602 to wait for a high priority contention window, such as window 514 referring back to FIG. 5.

BE is the backoff exponent, which is related to a number of slots (totaling the size of a "contention window" or "CW"), each slot having a number of symbols (e.g., in IEEE p1901.2 and G3, each slot has 2 symbols) up to which a device may have to wait before attempting to access a channel (i.e., CW=2^BE), and which may be initialized to the value of minBE in step 603, for example. In this embodiment, minBE has a value of three.

At step 604, the method may create a delay for a random number K of complete slots in the range 0 to 2'BE−1 (that is, within CW), and then request that a PCS operation be performed in step 605. This delay or backoff time is given by equation (4), where aSlotTime is equal to the duration of a number of symbols prescribed by a given standard.

$$\text{Backoff Time}=K\text{.times.}aSlotTime \tag{4}$$

At decision point 606, if the channel is assessed to be busy, the method may increment NB by one in block 610. At block 612, if the value of NB is less than or equal to a maximum number of allowed backoffs (maxCSMABackoffs), the method may return to block 602. If the value of NB is greater than maxCSMABackoffs, however, the method may terminate 613, for example, with a channel access failure status or indication. Returning to block 606, if the channel is assessed to be idle, the method may immediately begin transmission of the frame at block 607.

Figure 7:
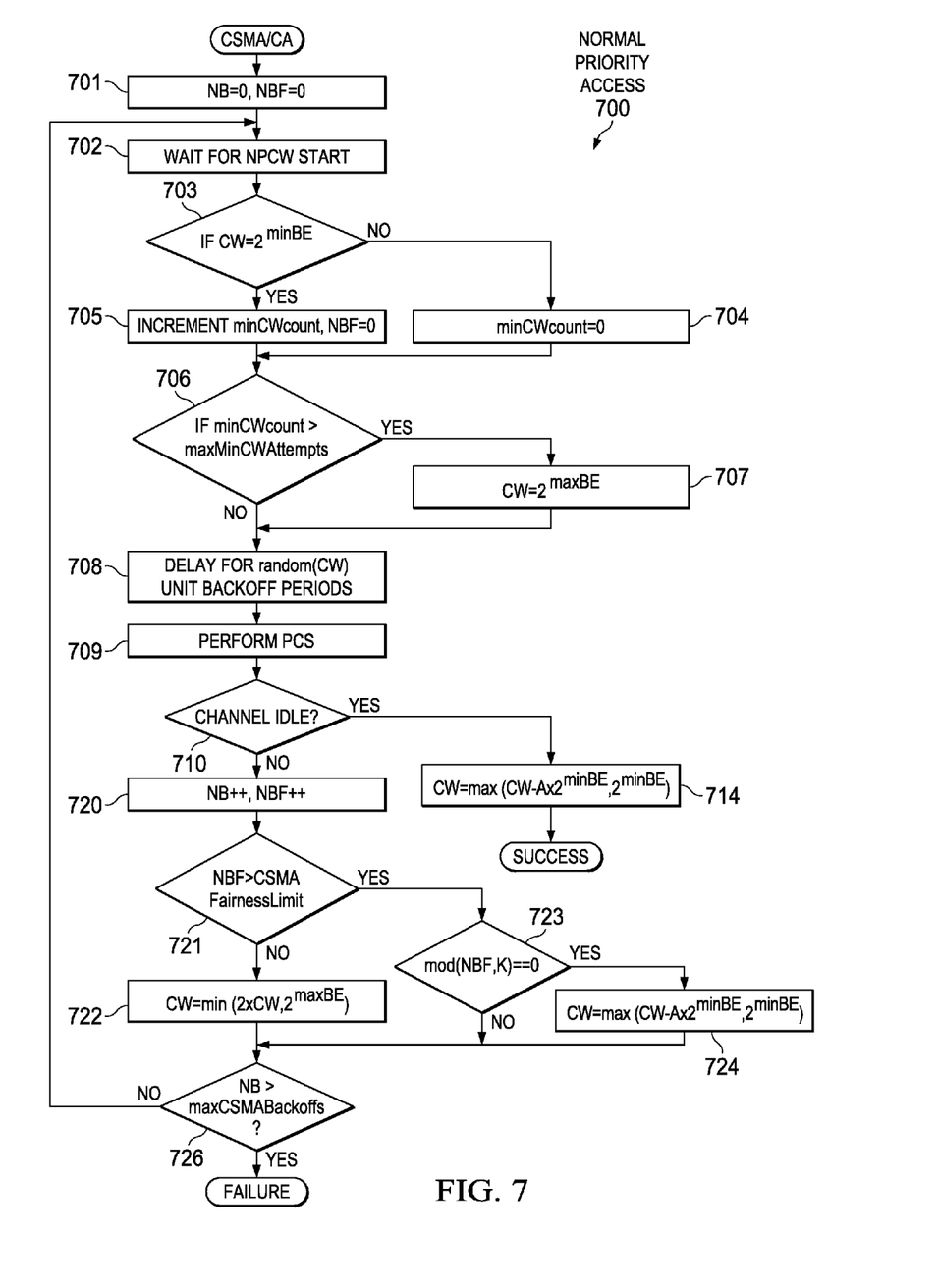
FIG. 7 is a flow diagram illustrating a normal priority CSMA/CA access in the PLC system of FIG. 1.

FIG. 7 is a flow diagram illustrating a normal priority CSMA/CA access method 700 in the PLC system of FIG. 1. Notice that the high priority CSMA technique does not maintain a history of CW values between transmissions of different frames, and does not adjust or modify those values as a function of the success or failure of previous frame transmissions. Indeed, in conventional CSMA techniques, although CW values may be adjusted for different attempts to transmit the same frame, that value is reset for each new frame, and thus historical CW values for previous frame(s) is/are lost. Furthermore, conventional CSMA techniques also do not dynamically determine maxBE (or maxCW) or minBE (or minCW) values. As such, those techniques tend to create certain "unfairness" problems and/or increase the probability of collisions. While this may be tolerable for limited high priority nodes, a large number of normal prior nodes may result in unfair access to many nodes. To address these and other issues, embodiments discussed herein provide techniques that, among other things, facilitate a further spreading of the time over which normal priority devices may attempt to transmit and to thereby reduce the probability of collisions.

One technique is, for example, Additive Decrease Multiplicative Increase (ADMI) mechanisms. Certain aspects of these techniques may be particularly well-suited for deployment in single-hop networks with a small number of devices, as well as many other environments. ADMI is described in detail in related Patent Publication 20130049939, entitled: Enhanced Carrier Sense Multiple Access (CSMA) Protocols," which is incorporated by reference herein. ADMI will be described briefly herein for completeness.

Another technique was mentioned above, where when NBF reaches the CSMAFairnessLimit for the number of unsuccessful attempts (channel access failures), embodiments may either retain the existing contention window for a number of retries or decrease it based on the rate adaptation variable R. Once the contention window reaches the minimum contention window value, the NBF may be reset to zero and the process may be repeated. In this manner, a node that loses a series of contention contests may increase the value of CW until the value of CW reaches a maximum CW value (maxCW); then hold the value of CW until the fairness number of backoff (NBF) repetitions reaches a fairness threshold (CSMAFairnessLimit); then incrementally reduce the value of CW until the value of CW reaches a minimum CW value (minCW). Various options and permutations for this CW tuning process will now be described in more detail.

The ADMI technique will first be briefly described. Generally speaking, each device may maintain four variables for each transmission attempt: NB, NBF, minCWCount, and CW. Similarly to FIG. 6, NB is the number of times method 700 has been required to backoff while attempting the same, current transmission. NBF is the fairness count that may be used by loosing nodes. NB and NBF value may be initialized to zero at the beginning of each transmission attempt. CW is the contention window for each device. For the very first transmission attempt of the very first frame, CW may be initialized to 2^minBE. Otherwise, the value of CW is retained from the last attempt. Thus, at step 701, NB and NBF may be initialized to zero.

At block 702, method 700 may wait for the start of a normal priority contention window, such as window 516, referring back to FIG. 5. Blocks 703-707 implement a fairness algorithm for successful nodes. At block 703, if CW=2^minBE, then the counter variable (minCWCount) is incremented at block 705; otherwise it is set to zero at block 704. Then, at block 706, method 700 determines whether minCWCount is greater than a maximum allowed value (maxMinCWCount) which controls how many times a successful device may use CW=2^minBE. If minCWCount>maxMinCWCount, then CW may be set to 2^maxBE (i.e., its maximum allowable size or maxCW) at block 707. Thus, using the mechanism of blocks 703-707, method 700 may ensure that CW only assumes its minimum allowed value (i.e., CW=minCW=2^minBE) for a maximum allowed number of times (i.e., maxMinCWCount), after which CW is set to its maximum allowed value (i.e., CW=maxCW=2^maxBE).

After blocks 706 or 707, method 700 proceeds to block 708, where the device may wait for a backoff time such that Backoff Time=K*aSlotTime and K is a random number within CW (e.g., 0<K<(CW−1) or 0<K<CW). At block 709, method 700 may perform a Physical Carrier Sense (PCS) operation to determine, at block 710, whether a given communication channel is idle. If so, then method 700 may transmit a packet, and block 714 may set CW such that CW=max(CWcurrent−A*2^minBE, 2^minBE). Parameter A is a scale factor that is typically set to a value of eight in this embodiment. However, it may be set to a larger or smaller value to vary the slope of the fairness profile. This final value of CW may be saved and may be used as the initial CW value for the next transmission attempt, for example.

It should be noted, however, that a linear decrease is but one suitable example of how to perform graceful degradation from maxCW. Other mechanisms to reduce the CW in response to successful transmission of a packet, for example, include using a logarithmic decreasing function, a quadratic decreasing function, and/or other polynomial decreasing function. Similarly, multiplicative increase is but one suitable example of how to perform a backoff (as used in exponential backoff) in response to lack of channel access and/or collision, for example. Other mechanisms also include using a logarithmic decreasing function, a quadratic decreasing function, and/or other polynomial decreasing function.

Figure 8:
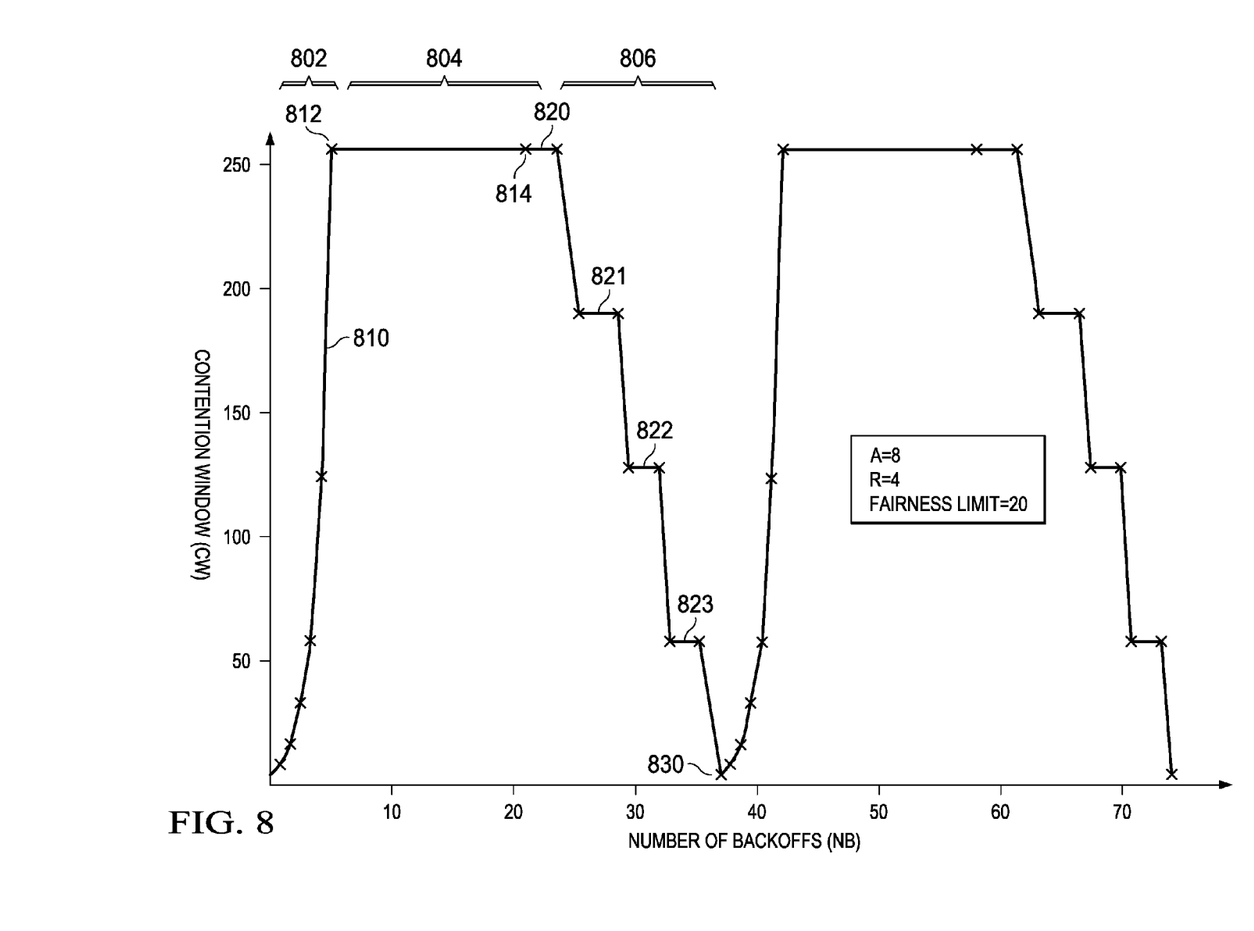
FIGS. 8-10 illustrate example backoff profiles that may be created by tuning fairness parameters.
Figure 9:
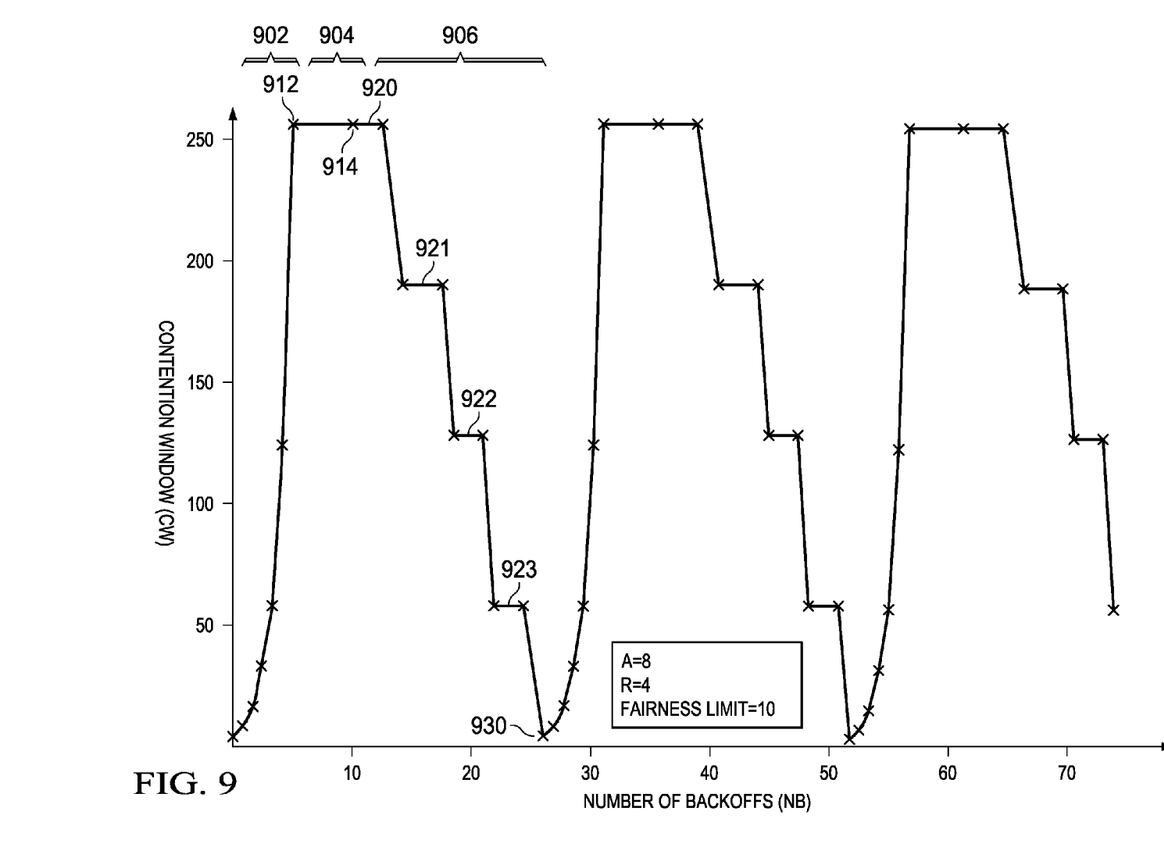

If the channel is busy, method 700 may increment NB and NBF at block 720 and perform a fairness method for loosing nodes that is implemented by blocks 720-724. At block 721, if the NBF is less than that of the CSMAFairnessLimit, the value of CW is doubled in block 722 provided that CW does not exceed 2MaxBE. If, on the other hand, the NBF is greater than or equal to the CSMAFairnessLimit, then value of CW is reduced in an incremental manner over a series of backoff attempts until the value of CW reaches a minimum CW value. Once the contention window reaches the minimum contention window value, the NBF is reset to zero in block 705 and the sequence of CW values is repeated until a successful transmission occurs In this example, the incremental reduction of CW is performed using a modulo function. When NBF is a multiple of R (Fairness Rate Adaptation Factor) as determined at block 723, the CW is linearly decreased in block 724 using scale factor parameter A as in the case of a successful transmission similar to block 714. This may allow for higher chance for pending frame transmission to succeed for this node which has not had the opportunity to transmit after many attempts. When the modulo value of NBF/R is not equal to zero, the CW value is maintained at the current value. This produces a declining value of CW that declines is a stepped manner, as illustrated in FIGS. 7-9. While in this example block 723 performs a modulo operation using NBF and R, a similar result may be obtained by performing a modulo operation using NB and R, for example.

In another embodiment, the sequential incremental decline of CW may be performed using alternate profiles, such as: a straight line with a constant slope, a segmented line with different slopes for different segments, a zig-zag line in which some portions may slope down and other portions may slope upward, etc., for example. Other mechanisms also include using a logarithmic decreasing function, a quadratic decreasing function, and/or other polynomial decreasing functions, for example.

For each backoff attempt, method 700 may determine whether NB is greater than a maximum number of allowed CSMA backoffs (maxCSMABackoffs) at block 726. If not, then control may return to block 702 for another try; otherwise method 700 may indicate a failure to transmit the packet or frame.

The parameters minCW, maxCW, R, and A are constants for this method. In this PLC embodiment, the recommended values are minCW=2^3=8, maxCW=2^8=256 and A=8. The value of rate adaption parameter R may be selected to according to equation (5), for example.

$$\max R \sim \max \text{ number of retries}/(\text{maxBE}-\text{minBE}) \quad (5)$$

Typically R is selected to have a value in the range of 1-10 when the maximum number of retries is at least 50. Of course, in other embodiments these parameters may be selected to have different values.

In a similar manner, the flow described with regard to FIG. 7 may be used for the slotted CSMA/CA algorithm for the optional multi-tone mask mode, as described in IEEE 1901.2. In that case, at block 702, instead of waiting for the next normal priority contention window, the method waits for the next slot boundary. The rest of the slotted transmission may be performed essentially as described with regard to FIG. 7.

Figure 10:
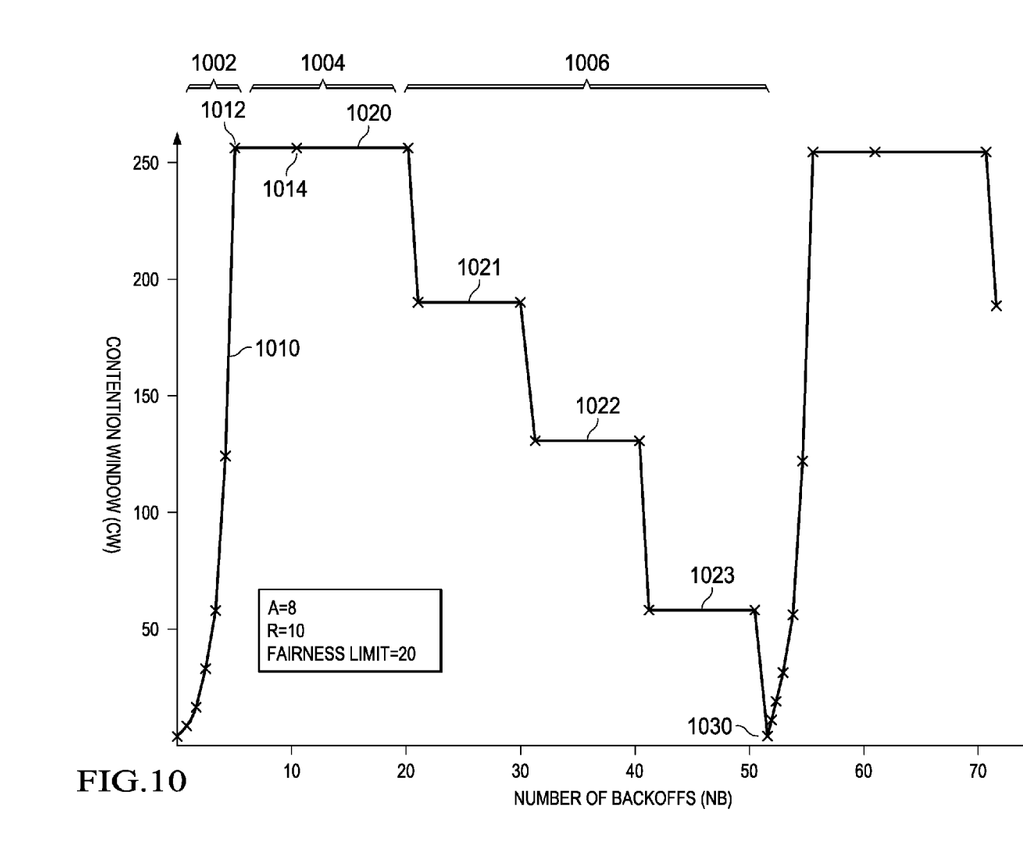

FIGS. 8-10 illustrate example backoff profiles that may be created by tuning the fairness parameters. FIG. 8 illustrates a profile in which A=8, R=4, the fairness limit=20. Note how the value of CW is increased 810 for a number of attempts 802 until a maximum value is reached at 812, is then held constant at the maxBE for a number of attempts 804 until NBF exceeds the fairness threshold at 814, and is then reduced for a number of attempts 806. Once the value of CW reaches the minimum CW value as indicted at 830, the sequence is repeated. The modulo calculation described in block 723, referring back to FIG. 7, causes the stair-step reduction at 820-823.

FIG. 9 illustrates a profile in which A=8, R=4, the fairness limit=10. Note how the value of CW is increased for a number of attempts 902 until a maximum value is reached at 912, is then held constant at the maxBE for a number of attempts 904 until NBF exceeds the fairness threshold at 914, and is then reduced for a number of attempts 906. Once the value of CW reaches the minimum CW value as indicted at 930, the sequence is repeated. The modulo calculation described in block 723, referring back to FIG. 7, causes the stair-step reduction at 920-923.

FIG. 10 illustrates a profile in which A=8, R=10, the fairness limit=20. Note how the value of CW is increased for a number of attempts 1002 until a maximum value is reached at 1012, is then held constant at the maxBE for a number of attempts 1004 until NBF exceeds the fairness threshold at 1014, and is then reduced for a number of attempts 1006. Once the value of CW reaches the minimum CW value as indicted at 1030, the sequence is repeated. The modulo calculation described in block 723, referring back to FIG. 7, causes the stair-step reduction at 1020-1023.

FIGS. 8-10 illustrate only three combinations of parameters A, R, and the fairness limit. Many other combinations are possible, as discussed in more detail above.

In the embodiments described above, the value if CW is increased in regions 802, 902, 1002 by doubling the value of CW until a maximum value is reached. In other embodiments, other functions may be used to increase the value of CW, such as: a straight line with a constant slope, a segmented line with different slopes for different segments, a zig-zag line in which some portions may slope down and other portions may slope upward, etc., for example. Other mechanisms also include using a logarithmic increasing function, a quadratic increasing function, and/or other polynomial increasing functions, for example.

In sum, as noted above, a node or device may start a CSMA procedure with a CW value used in the transmission of a previous frame, and it may then generate a random number K between 0 and CW (or 0 and CW−1, for example). The device may then attempt to access the channel after K*aSlotTime duration time. If the device finds the channel to be busy before and/or upon expiration of the backoff time, it may increase (e.g., double) its CW provided the new value is less than or equal to maxCW. If the new value is more than maxCW, the device may maintain the current value of CW. If NBF exceeds the fairness limit, the device may reduce the value of CW in an agreed upon manner. The device may then try to contend again after waiting for the necessary inter frame time. In some embodiments, if a device finds the channel to be free and executes a transmission, the process may be considered a success without the need to receive an acknowledge packet in return. In other embodiments, however, the ACK packet may be required in order for the transmission to be considered a success. In those cases, if the device finds the channel to be free but it transmits the packet or frame without receiving an ACK for it (an example of a collision scenario), the device may then repeat the same process as in the case where it failed to get access to the channel. Conversely, if the device finds the channel to be free, transmits the packet or frame, and then receives a corresponding ACK (an example of a success scenario), then it may decrease its CW linearly by A*minCW provided the new value is greater than or equal to minCW, otherwise the device may maintain the current value of CW.

In some embodiments, systems and methods described herein may dynamically determine maxCW. For example, after N updates an average CW and/or K value may be competed. Then, if the average CW and/or K value is greater than a first threshold the maxCW may be increased. Similarly, if the average CW and/or K value is smaller than a second threshold, the maxCW may be decreased. Likewise, the minCW value may be dynamically adjusted based on average CW or K over a number of transmissions, for example. These techniques may enable CW values to be updated based upon the success/failure of previous transmissions without being changed or reset for every packet or frame to be serviced.

In a similar manner, the value of the scale factor parameter (A), the CSMAFairness parameter, and the adaptive rate factor (R) may be dynamically adjusted based on average values of CW or K over a number of transmissions.

In this manner, embodiments may ensure fairness for a small number of nodes in saturated single hop conditions, while allowing for similar throughput gains over binary exponential back-off and other adaptive schemes.

Other Embodiments

In the description herein, some terminology is used that is specifically defined in the G3 and IEEE p1901.2 standards and/or is well understood by those of ordinary skill in the art in PLC technology. Definitions of these terms are not provided in the interest of brevity. Further, this terminology is used for convenience of explanation and should not be considered as limiting embodiments of the invention to the G3 and IEEE 1901.2 standards. One of ordinary skill in the art will appreciate that different terminology may be used in other encoding standards without departing from the described functionality.

In various embodiments, the systems and methods described herein may be applicable to a wide variety of communication environments, including, but not limited to, those involving wireless communications (e.g., cellular, Wi-Fi, WiMax, etc.), wired communications (e.g., Ethernet, etc.), Power Line Communications (PLC), or the like. For ease of explanation, several examples discussed below are described specifically in the context of PLC. As a person of ordinary skill in the art will recognize in light of this disclosure, however, certain techniques and principles disclosed herein may also be used in other communication environments.

The techniques described in this disclosure may be implemented in hardware, software, firmware, or any combination thereof. Various combinations of hardware and/or software state machines may be used. If implemented in software, the software may be executed in one or more processors, such as a microprocessor, application specific integrated circuit (ASIC), field programmable gate array (FPGA), software state machines, or digital signal processor (DSP), for example. A stored program in an onboard or external (flash EEP) ROM (read only memory) or FRAM (ferroelectric random access memory) may be used to implement aspects of the signal processing. The software that executes the techniques may be initially stored in a computer-readable medium such as a flash drive, a compact disc (CD), a diskette, a tape, a file, memory, or any other computer readable storage device and loaded at a manufacturing site for execution in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A method for performing transmission over a communication channel using carrier sense multiple access collision avoidance (CSMA/CA) by a communication device, the method comprising:

determining a contention window (CW);

determining if the communication channel is busy by performing carrier sensing by the communication device after a backoff time proportional to a randomly generated number (K); wherein K is between 0 and CW−1;

if the channel is determined to be not busy, then transmitting a frame of data;

if the channel is determined to be busy, periodically determining if the communication channel is busy after subsequent backoff times, wherein a value of CW is adjusted for subsequent backoff times using a fairness protocol, wherein the fairness protocol comprises:

determining if a fairness count (NBF) reaches a CSMA Fairness Limit {CSMAFairnessLimit};

if NBF is less than the CSMAFairnessLimit, increasing the value of CW until the value of CW reaches $2^{maxBE}$;

if NBF is less than the CSMAFairnessLimit, reducing the value of CW in a stepped manner until the value of CW reaches a $2^{minBE}$.

2. The method of claim 1, wherein reducing the value of CW is performed in a modulo manner based on NBF and a fairness rate adaption factor.

3. The method of claim 2, wherein when the modulo of NBF/the fairness rate adaption factor equals zero the value of CW is reduced by an amount, and when the modulo of NBR/the fairness rate adaption factor is not equal to zero the value of CW is not changed.

4. The method of claim 3, wherein the value of the fairness rate adaption factor is less than or equal to a maximum backoff threshold value divided by (a maximum backoff exponent (maxBE) minus a minimum backoff exponent (minBE)).

5. The method of claim 1, further comprising declaring a failure to transmit if a total number of backoffs (NB) exceeds a maximum backoff threshold.

6. The method of claim 1, wherein CW has an initial value carried over from a previous transmission of a different frame.

7. The method of claim 1, wherein the backoff time is equal to K times aSlotTime.

8. The method of claim 1, wherein increasing the value of CW comprises doubling the value of CW.

9. A collision sense multiple access (CSMA) communications device comprising a processor and a memory coupled to the processor, the memory configured to store program instructions executable by the processor to cause the communications device to perform a method comprising:
determining a contention window (CW);
determining if the communication channel is busy by performing carrier sensing by the communication device after a backoff time proportional to a randomly generated number (K); wherein K is between 0 and CW−1;
if the channel is determined to be not busy, then transmitting a frame of data;
if the channel is determined to be busy, then periodically determining if the communication channel is busy after subsequent backoff times, wherein a value of CW is adjusted for subsequent backoff times using a fairness protocol, wherein the fairness protocol comprises:
determining if a fairness count (NBF) reaches a CSMA Fairness Limit {CSMAFairnessLimit};
if NBF is less than the CSMAFairnessLimit, increasing the value of CW until the value of CW reaches $2^{maxBE}$;
if NBF is less than the CSMAFairnessLimit,
reducing the value of CW in a stepped manner until the value of CW reaches a $2^{minBE}$.

10. The method of claim 9, wherein reducing the value of CW is performed in a modulo manner based on NBF and a fairness rate adaption factor.

11. The method of claim 10, wherein when the modulo of NBF/the fairness rate adaption factor equals zero the value of CW is reduced by an amount, and when the modulo of NBR/the fairness rate adaption factor is not equal to zero the value of CW is not changed.

12. The method of claim 10, wherein the value of the fairness rate adaption factor is less than or equal to a maximum backoff threshold value divided by (a maximum backoff exponent (maxBE) minus a minimum backoff exponent (minBE)).

13. The method of claim 9, further comprising declaring a failure to transmit if a total number of backoffs (NB) exceeds a maximum backoff threshold.

14. The method of claim 9, wherein CW has an initial value carried over from a previous transmission of a different frame.

15. The communication device of claim 9, further comprising:
a receiver coupled to the processor, wherein the receiver comprises an analog front end configured to receive orthogonal frequency division multiplexing (OFDM) symbols from a power line; and an OFDM demodulator; and
a transmitter coupled to the processor, wherein the transmitter comprises an analog front end configured to couple OFDM symbols to the power line, and a modulator configured to produce the OFDM symbols representative of data.

16. A non-transitory computer-readable medium storing software instructions that, when executed by a processor, cause a method for performing transmission over a communication channel using carrier sense multiple access collision avoidance (CSMA/CA) by a communication device to be performed, the method comprising:
determining a contention window (CW);
determining if the communication channel is busy by performing carrier sensing by the communication device after a backoff time proportional to a randomly generated number (K); wherein K is between 0 and CW−1;
if the channel is determined to be not busy, then transmitting a frame of data;
if the channel is determined to be busy, then periodically determining if the communication channel is busy after subsequent backoff times, wherein a value of CW is adjusted for subsequent backoff times using a fairness protocol, wherein the fairness protocol comprises:
determining if a fairness count (NBF) reaches a CSMA Fairness Limit {CSMAFairnessLimit};
if NBF is less than the CSMAFairnessLimit, increasing the value of CW until the value of CW reaches $2^{maxBE}$;
if NBF is less than the CSMAFairnessLimit,
reducing the value of CW in a stepped manner until the value of CW reaches a $2^{minBE}$.

* * * * *